United States Patent [19]
Frank et al.

[11] Patent Number: 5,797,376
[45] Date of Patent: Aug. 25, 1998

[54] DEVICE FOR RECEIVING FUEL FEEDING AGGREGATE IN FUEL CONTAINER

[75] Inventors: Kurt Frank, Schorndorf; Wolfgang Wuerl, Sachsenheim, both of Germany

[73] Assignee: Robert Bosch GmbH, Stuttgart, Germany

[21] Appl. No.: 732,490

[22] PCT Filed: Feb. 23, 1996

[86] PCT No.: PCT/DE96/00302

§ 371 Date: Oct. 28, 1996

§ 102(e) Date: Oct. 28, 1996

[87] PCT Pub. No.: WO97/01704

PCT Pub. Date: Jan. 16, 1997

[30] Foreign Application Priority Data

Jun. 29, 1995 [DE] Germany .................... 195 23 634.3

[51] Int. Cl.⁶ .................................................. F02M 33/04
[52] U.S. Cl. ........................................ 123/509; 181/202
[58] Field of Search ............................... 123/509, 475; 417/312, 313, 360, 423.3, 423.14, 363; 181/200, 202, 204

[56] References Cited

U.S. PATENT DOCUMENTS

| | | | |
|---|---|---|---|
| 4,728,266 | 3/1988 | Matsumoto et al. | 181/202 |
| 5,151,018 | 9/1992 | Clendenin et al. | 417/312 |
| 5,272,285 | 12/1993 | Miller | 181/202 |
| 5,392,750 | 2/1995 | Laue et al. | 123/509 |
| 5,407,330 | 4/1995 | Rimington et al. | 181/202 |

*Primary Examiner*—Thomas N. Moulis
*Attorney, Agent, or Firm*—Michael J. Striker

[57] ABSTRACT

A device for receiving a fuel delivery unit (12) inside a fuel tank, in particular of motor vehicles, is proposed. The fuel delivery device (12) is essentially completely surrounded by a damping element (14), wherein the damping element (14) is connected with a holding device (13) and essentially completely decouples the fuel delivery unit (12) from the holding device (13). The device (11) can be arranged via the holding device (13) in the fuel tank. (FIG. 1 in connection with this).

12 Claims, 3 Drawing Sheets

DEVICE FOR RECEIVING FUEL FEEDING AGGREGATE IN FUEL CONTAINER

BACKGROUND OF THE INVENTION

The invention relates to a device for receiving a fuel delivery unit inside a fuel tank.

Up to now, for the muffled installation of a fuel delivery unit inside a fuel tank, the unit was placed in a damping element, made of rubber or a fuel-resistant plastic material, which was fixed in place in a suitable manner in the tank. However, these damping elements, which are made of rubber and immersed in the fuel, harden. Alternative materials, such as plastic, swell up greatly in fuel. With both options it was therefore possible for noise-conducting bridges to be created over time.

A delivery unit holder is known from DE-PS 39 12 773, in which damping elements made of flow, net, grid or cell structures, which maintain their elasticity, are provided. The elasticity of these damping elements is therefore not determined by the elastomeric properties of the material, but in that this material has been given a suitable, elastically yielding structure. The fuel delivery unit is connected with the damping element by means of hose clamps which in turn are connected with the fuel tank. An installation of a fuel delivery unit of this type has a multitude of mechanical connections and elaborate connecting techniques for receiving and fixing the fuel delivery unit in place in the fuel tank.

SUMMARY OF THE INVENTION

The device in accordance with the invention has a simple and cost-effective arrangement for the installation of a fuel delivery unit in a fuel tank. This arrangement essentially consists of a damping element, which essentially completely encloses the fuel delivery unit, and of a holding device, by means of which the damping element can be arranged in the fuel tank. It is possible by means of this to achieve a considerable reduction of the elements required for installation, as well as of the costs for mounting and checking. Furthermore, the risks connected with the elaborate connecting systems known from the prior art can be omitted.

Furthermore, because of the damping element, which essentially completely encloses the fuel delivery unit, an almost complete uncoupling of the fuel delivery unit from the holding device and therefore from the fuel tank can be provided, without further mechanical connections on the fuel delivery unit and the holding device being required. By means of this it is possible to achieve a high degree of vibration insulation, which leads to a low-noise housing.

In an advantageous embodiment of the device the damping element is embodied as a foam body which interlockingly surrounds at least the fuel delivery unit. A secure reception and defined position of the fuel delivery unit in the damping element is provided by means of this. The foam body can be designed to be open on one side, so that the fuel delivery unit can be inserted into it, and it can be closed by the holding device, wherein the holding device can be attached in an interlocking and/or frictionally connected manner to the open side of the foam body.

A further advantageous embodiment of the damping element lies in the use of an open-celled foam body. By means of this it is possible to create a suitable, elastically yielding structure, wherein noise elimination remains unchanged over extended periods of time. Alternately it can also be provided that damping elements, which are made of closed-celled or mixed cell material, are usefully employed. It can furthermore be provided that the foam body has, at least partially, a grid structure of metal fibers or thin metal wires, which can reinforce the foam body at least partially.

In accordance with a further advantageous embodiment of the device it has been provided that the damping elements are made as two- or multi-piece elements. By means of this it is possible to develop pre-formed or already foamed half shells or shaped elements, which can be combined in a simple manner into a damping element during assembly.

These damping elements, which are advantageously embodied as two- or multi-piece elements, can have a parting plane extending either radially or axially. A damping element designed from two half shells with an axial parting plane is advantageous for simple assembling. In this case it is possible, for example, to insert the preassembled fuel delivery unit with a pre-screen disposed thereon, as well as electrical connecting lines and a connecting line to the flow line into the one half shell, and to simply combine it with the second half shell of the damping element into a damping element.

A further advantageous embodiment provides detent or snap elements, which are respectively placed opposite each other, on the two or multi-piece damping elements, so that the two or multi-piece damping elements can be simply and quickly disposed, fixed to one another without the use of further connecting means.

A further advantageous embodiment of the invention resides in the fastening of the damping element by means of at least one fastening element arranged on the holding element, which is disposed on a receptacle formed on the fuel tank. The fastening element can be embodied as a bracket or a circumferential, radially outward oriented section or the like. The damping element can be fixed by a front face on the holding device. In this way the holding device can be disposed fixed on the fuel tank and the suppression of the noise transmitted through the holding flange can be made possible by means of the damping element receiving the fuel delivery unit.

A further advantageous embodiment of the device is the development of the holding device with defined connecting elements, such as an electrical connecting point, a connector formed thereon which makes possible the connection of the fuel line to the engine as well as the connection with the fuel delivery unit and which has a connector for a return line, if required, provided such a device is used for a system with engine scavenging by means of fuel. The holding device furthermore has a circumferential collar, which can grip the damping element completely, at least at the front, and receive it and in this way fix it on the holding device.

It is provided in accordance with a further advantageous embodiment of the invention that the damping element is enclosed at least partially by a sleeve, which is at a distance from the holding device. The sleeve completely encloses the pre-screen, at least viewed in the axial direction, and extends at least partially along the fuel delivery unit. The disposition of the sleeve on the damping element is of particular advantage with an upright or angled installation of the fuel delivery unit in the fuel tank. It is possible in this way to prevent the fuel in an almost empty tank from sloshing away, for example when driving around a curve or on stretches with steep up- or down-grades. Because of its design, the open-celled foam material can have a sponge effect and absorb fuel, so that in such extreme situations the fuel delivery unit itself can be provided with fuel over a defined period of time.

BRIEF DESCRIPTION OF THE DRAWINGS

A preferred exemplary embodiment of the invention is represented in the drawings and will be explained in detail in the following description. Shown are in:

3

Figure 1:
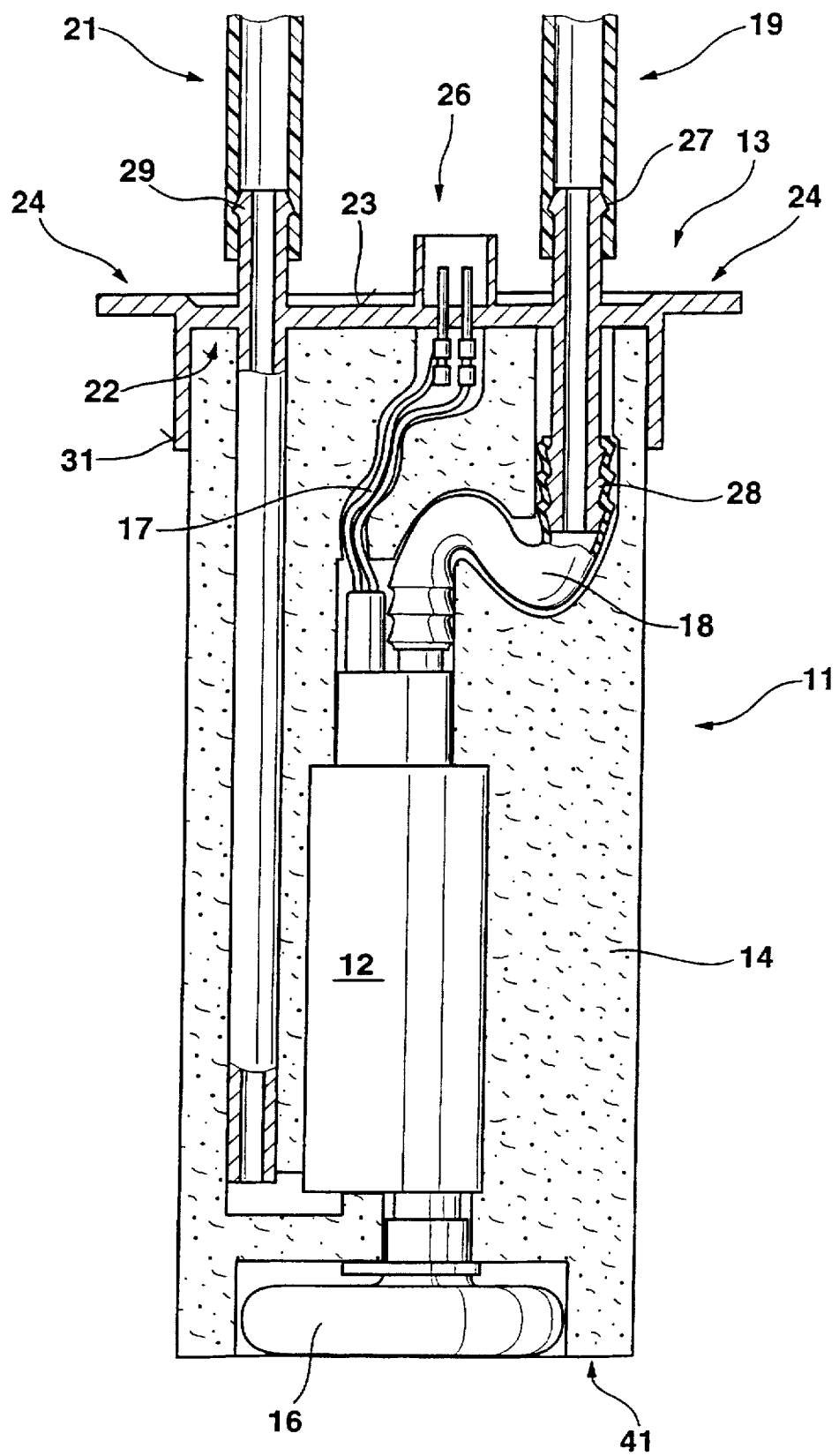
Figure 2:
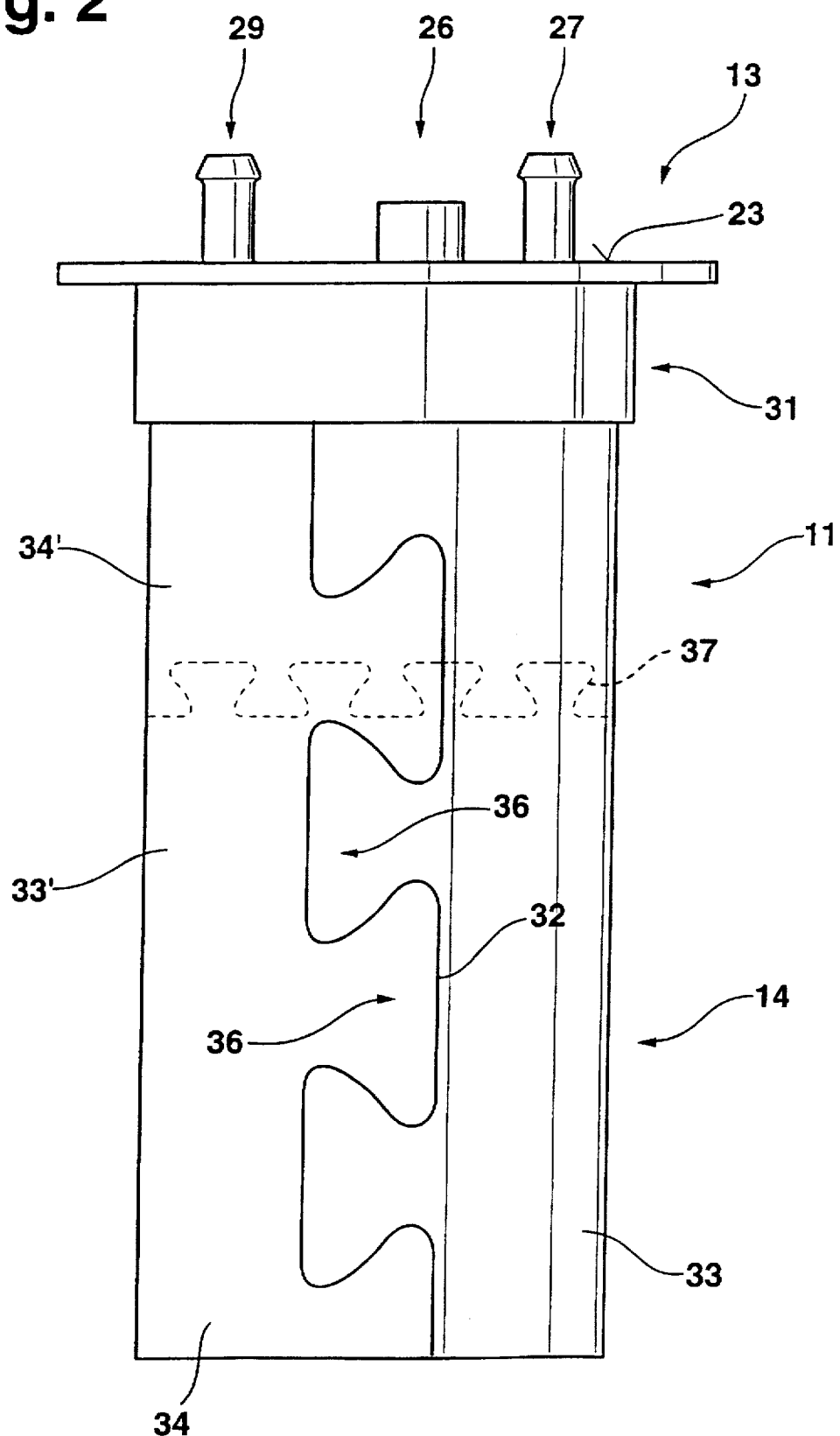
Figure 3:
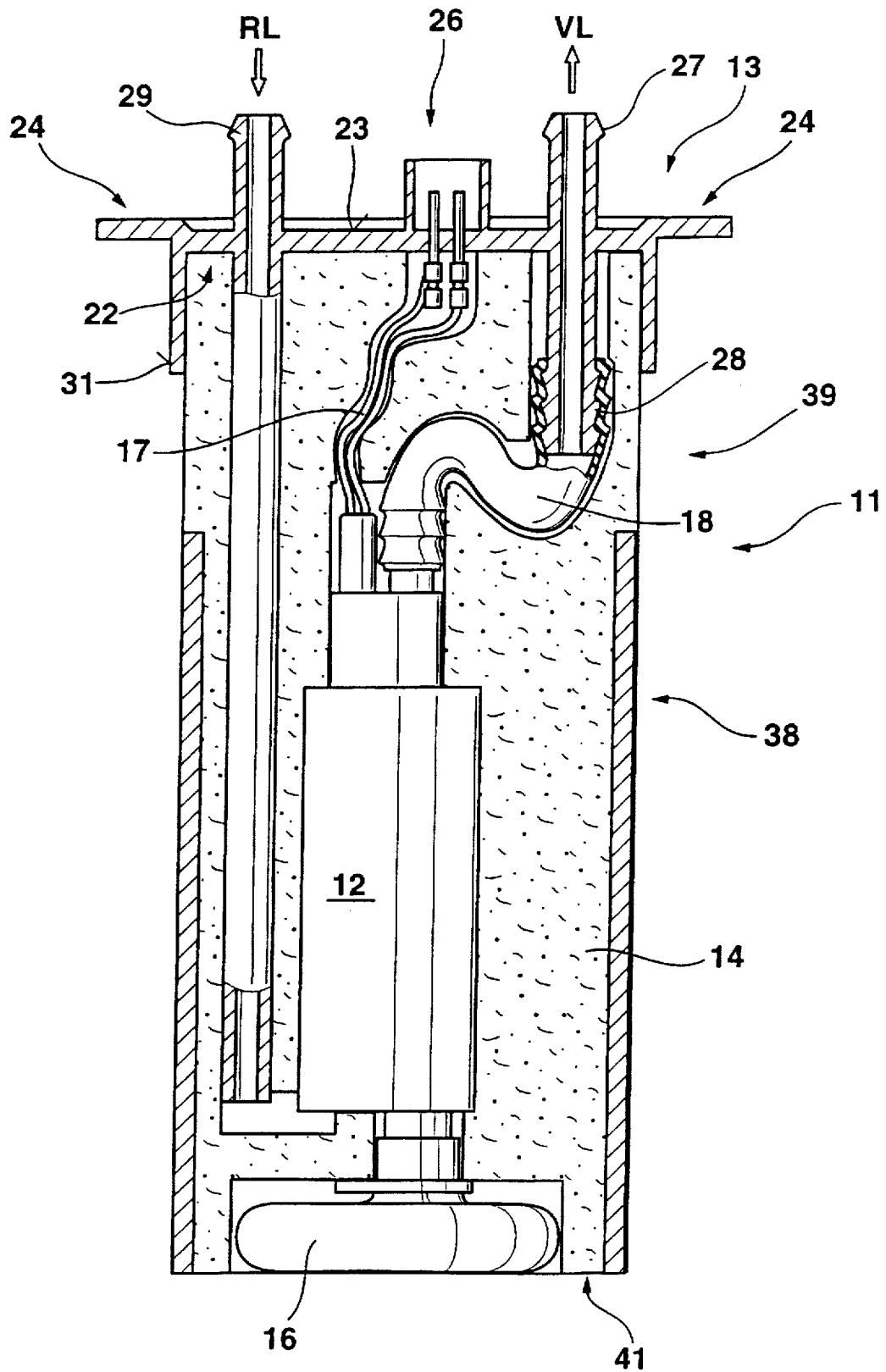

FIG. 1, a schematic sectional view of a device in accordance with the invention, FIG. 2, a schematic view of a two-piece damping element with an axial and radial (in dashed lines) parting plane, and FIG. 3, a schematic sectional view of a a further advantageous embodiment of the device in accordance with the invention.

DESCRIPTION OF THE PREFERRED EMBODIMENT

FIG. 1 represents a device 11 for a fuel delivery unit 12, which is to be installed inside a fuel tank, which is fastened in a suitable manner on the floor (not shown) of the fuel tank. The fuel delivery unit 12 comprises a feed pump and a drive element for the feed pump, which are arranged in a common housing. For example, the device 11 can be disposed in preformed recesses of a fuel tank, which is to be made of plastic. The fuel delivery unit 12 can be arranged close to the bottom of the tank in an upright or horizontal position, as well as in an oblique position provided at any arbitrary angle.

The device 11 consists of a holding device 13, which fixes the device 11 in respect to the fuel tank, and of a damping element 14 disposed on the holding device 13. The damping element 14 has a cylindrical shape and is embodied as an open-celled foam body. It is obvious that the damping element 14 can have other developments which are different from the cylindrical shape. The foam body can also be made of closed cells or mixed cells. The open-celled foam body can further have a sealed outer skin. The foam body is made of already known foam material which maintains its elastic and resilient structure over a long period of time under the effects of fuel.

Recesses for the fuel delivery unit 12 and a pre-screen 16, which is connected with it, as well as for electrical connecting lines 17 and a connecting element 18 leading from the fuel delivery unit 12 to a flow line 19 are provided in the damping element 14. These recesses in the damping element 14 are designed in such a way that at least the fuel delivery unit 12 is interlockingly enclosed.

As represented by way of example in FIG. 1, it is possible, depending on the particular case of application, to provide a recess for a return line 21, such as is required in conventional systems for engine scavenging. This return line 21 can also be omitted in specific applications.

No further connecting techniques nor noise elimination elements made of caoutchouc or plastic or the like are required, which would result in noise-conducting bridges after a short period of time.

The holding device 13 embodied as a flange is disposed on a front 22 of the damping element 14 located opposite the pre-screen 16. It has a disk-shaped base body 23, on which fastening elements 24 are formed, which project outward from the sides. The fastening elements 24 can be adapted in a known manner, depending on the design of the fuel tank, and can be fixed in place on the fuel tank, for example via a screw, detent, snap, clamping connection or the like. An electrical connecting point 26 is provided on the disk-shaped base body 23, to which an electrical connecting line 17 for the control of the fuel delivery unit 12 can be connected. Furthermore, a connector 27, which projects away from the damping element 14 is provided, on which the flow line 19 can be slipped. The connector 27 has a connecting element 28, which is located opposite it and projects into the damping element 14 and to which the connecting element 18 slipped on the fuel delivery unit 12 is attached. Furthermore,

4 a connector 29 for the return line 21 is provided. The length of this connector 29 can be designed to be such that it extends as far as an aspirating side of the fuel delivery unit 12. Alternatively, the connector 29 can be embodied in the same way as the connector 27, wherein a connecting element 18, preferably a gasoline hose, which leads to the aspirating side of the fuel delivery unit 12, can also be arranged in the damping element 14.

A circumferential collar 31 is formed on the disk-shaped base body 23, which at least partially surrounds the cylindrical damping element 14 and fixes it in place on the disk-shaped base body 23. In order to assure additional security for the installation of such a device 11, it is possible to provide a holding element in the fuel tank, which is disposed on the front 41 located opposite the front 22 of the damping element 14, which for example has been preformed in the fuel tank.

The holding device 13 is advantageously made of a plastic material suitable for use in fuel tanks, such as POM. It is also possible to provide a holding device 13 made of a metal or non-metal, which has a plastic coating, if required.

The device 11 with the damping element 14, which has a parting plane 32 extending in the axial direction, is represented in FIG. 2. The two-piece damping element 14 consists of two pre-formed or pre-foamed half shells 33, 34, which are combined in a simple manner after insertion of the fuel delivery unit 12 with the pre-screen 16 and the electrical connecting lines 17, as well as the intermediate element 18 and, if required, the return line 21. Detent elements 36, which are respectively placed opposite each other, are disposed on the half shells 33, 34 in the parting plane 32, by means of which the half shells 33, 34 are fixed in place with each other.

Alternatively it is also possible to provide a radially extending parting plane 37 (in dashed lines), wherein the half shells 33', 34' can have the same characteristics as the above described half shells 33, 34. It is also possible for the damping element 14 to consist of several pieces, wherein the multi-piece embodiment is also made of symmetrically designed pieces and advantageously has detent elements, so that simple mounting and production remains assured.

A further alternative embodiment of the damping element 14 can consist in that the fuel delivery unit 12 with the pre-screen 16 is pre-mounted on the holding device 13, and the damping element 14 is foamed on the holding device 13.

A further alternative embodiment of the device 11 is represented in FIG. 3. The damping element 14 is surrounded by a sleeve 38, which can be produced as a simple injection-molded element, for example of plastic or the like. The sleeve 38 extends at least partially from a front 41 of the damping element 14 located opposite the front 22 in the direction toward the holding device 13. A free space 39 is provided between the collar 31 and the sleeve 38, so that through this free space 39 fuel can flow into the damping element 14, which can absorb fuel because of its sponge-like structure. This embodiment is of particular advantage with an upright arrangement of the device 11, since it is possible to prevent the fuel from sloshing away, particularly during driving around curves, because it can be retained in the damping element 14 by means of the sleeve 38. The sleeve 38 can in addition reinforce the damping element 14 and can be fastened on the fuel tank. It is also possible to adapt the sleeve 38 to different geometric designs of the damping element 14.

We claim:

1. A device for receiving a fuel delivery unit inside a fuel tank of a motor vehicle, comprising at least one damping element which is adapted to essentially completely enclose the fuel delivery unit; a holding device attachable to the damping element to be arranged in the fuel tank, said damping element being formed as a foam body which is adapted to interlockingly enclose at least the fuel delivery unit.

2. A device as defined in claim 1, wherein said damping element is formed as an open-cell foam body.

3. A device for receiving a fuel delivery unit inside a fuel tank in a motor vehicle, comprising a damping element formed as at least a two-piece element and has recesses for receiving elements selected from the group consisting of the fuel delivery unit, electrical connecting lines, a flow line at least for a connecting piece, and a pre-screen of the fuel delivery unit.

4. A device as defined in claim 3, wherein said at least two-piece damping element has a parting plane which extends axially in respect to a longitudinal axis of the fuel delivery unit.

5. A device as defined in claim 3, wherein said at least two piece damping element has a parting plate which extends radially in respect to a longitudinal axis of the fuel delivery unit.

6. A device as defined in claim 3, wherein said at least two-piece damping element has detent elements located in the parting plane.

7. A device as defined in claim 1; and further comprising a holding device provided with at least one fastening element for fastening in the fuel tank and is disposed on at least one front of said damping element.

8. A device as defined in claim 7, wherein said holding device has at least one electrical connecting point, one connector which is connected with a flow line, and one collar which encloses said damping element at least partially.

9. A device as defined in claim 7; and further comprising a sleeve provided on an end of said damping element located opposite to said holding device and extending at least partially from a front located opposite to said holding device in a direction toward said holding device.

10. A device as defined in claim 3; and further comprising a holding device provided with at least one fastening element for fastening in the fuel tank and disposed on at least one front of said damping element.

11. A device as defined in claim 10, wherein said holding device has at least one electrical connecting point, one connector which is connected with a flow line and one collar which encloses said damping element at least partially.

12. A device as defined in claim 10; and further comprising a sleeve provided on an end of said damping element located opposite to said holding device and extending at least partially from a front located opposite to said holding device in a direction toward said holding device.

* * * * *